Patented Sept. 12, 1933

1,926,050

UNITED STATES PATENT OFFICE 1,926,050

VAT DYESTUFFS OF THE DIBENZANTHRONE SERIES

Max Albert Kunz, Mannheim, Karl Koeberle and Erich Berthold, Ludwigshafen-on-the-Rhine, Germany, assignors to General Aniline Works, Inc., New York, N. Y., a corporation of Delaware No Drawing. Application April 24, 1930, Serial No. 447,107, and in Germany April 27, 1929

6 Claims. (Cl. 260—61)

The present invention relates to the production of halogen derivatives of dibenzanthrones and isodibenzanthrones.

We have found that halogen derivatives of the dibenzanthrone series different from those obtainable by halogenation processes heretofore proposed, are obtained by treating a dibenzanthrone which term is meant to comprise also isodibenzanthrones in fused anhydrous metal halides with a halogenating agent, for example free halogen or agents supplying halogen, such as sulphuryl chloride, iodine chloride and the like, in the absence of a diluent. Metal halides which are especially suitable for carrying out the process according to the present invention are metal halides dissociating at higher temperatures splitting off halogen, for example the halides of iron, aluminium, antimony, mercury and the like and mixtures of these halides, other metal halides such as for example the halides of alkaline earth metals may, however, also be used. In order to decrease the melting point of the metal halides used for halogenation, substances, in particular salts, lowering the melting point may be added to the reaction mixture. Alkali and alkaline earth metal halides are especially suitable for the said purpose. The usual halogenating catalysts may be added in order to further the halogenation, for example iodine, sulphur and other non-metals and compounds thereof. When anhydrous metal halides which dissociate at higher temperatures splitting off halogen are employed halogenation may be effected by means of the said metal halides alone without the addition of a further halogenating agent. The temperatures at which dissociation begins vary with the different metal halides and are about 100° C. with iron chloride and antimony chloride, whereas with aluminium chloride temperatures of about 150° C. or higher are necessary. The halogenation in or by means of the said metal halides has the advantage that the halogenation can be carried out at higher temperatures as are practicable when working in other inorganic media, for example sulphuric acid or its derivatives, since side reactions, for example sulphonation or oxidation, do not occur, so that highly halogenated products can be obtained. Thus tetra-, pentahalogendibenzanthrones or products containing even more halogen atoms can readily be produced. Moreover, the products are directly obtained in a state ready for dyeing.

The mixed halogenated dyestuffs of the dibenzanthrone series obtainable in the aforedescribed manner dye cotton usually violet to blue shades having excellent properties as regards fastness. For example bromdibenzanthrones chlorinated according to the present invention have the important property, inter alia, that their shades are substantially independent of the dyeing temperature, and they therefore differ from brom- and chlorbromdibenzanthrones hitherto known. The halogen dibenzanthrones and isodibenzanthrones obtained in this manner are generally speaking much more fast to drops of water than the initial materials. In addition to being employable as vat and pigment dyestuffs they may also be used as intermediate products for the manufacture of new dyestuffs by reason of their excellent reactivity. When necessary they may be purified by the usual methods, as for example by crystallization from organic solvents or from sulphuric acid, or by boiling up with these, or by treatment with oxidizing agents as for example treatment with a hypochlorite solution. The leuco preparations or leuco esters may be obtained from the dyestuffs according to the usual methods.

The following examples will further illustrate how the said invention may be carried out in practice, but the invention is not restricted to these examples. The parts are by weight.

Example 1

31 parts of dibromdibenzanthrone, prepared by bromination of dibenzanthrone in chlorsulphonic acid, are introduced at 120° centigrade while stirring into a melt of 300 parts of aluminium chloride, 60 parts of common salt and 3 parts of iodine and the reaction mixture is stirred for several hours at 180° centigrade. When the evolution of hydrochloric acid has ceased the melt is poured into dilute hydrochloric or sulphuric acid, and the reaction product is filtered off by suction while hot, washed until neutral and dried. The resulting dyestuff, a chlordibromdibenzanthrone, which is obtained in the form of a dark blue powder, dissolves in concentrated sulphuric acid giving a violet colouration, yields a green-blue vat and dyes cotton navy blue shades of very good fastness.

Example 2

35 parts of tribromdibenzanthrone are introduced at 150° centigrade while stirring into a melt of 300 parts of anhydrous iron chloride and 75 parts of common salt and the reaction mixture is stirred for several hours at this temperature. When the reaction is completed, which may be ascertained by the fact that a sample taken out yields a greenish-blue vat solution, the reaction mixture is worked up as described in Example 1. The resulting dyestuff, a dark blue powder, which according to analysis is a chlorinated tribromdibenzanthrone, dissolves in concentrated sulphuric acid giving a violet colouration and yields excellently fast blue dyeings on the vegetable fibre.

Instead of tribromdibenzanthrone other halogen dibenzanthrones, as for example tribrommonochlordibenzanthrone, may be subjected to this reaction.

*Example 3*

46 parts of pure isodibenzanthrone are introduced while stirring at 80° centigrade into a melt of 300 parts of iron chloride and 45 parts of common salt. After the addition of 2 parts of iodine and 27 parts of bromine the reaction mixture is stirred for some hours at from 80° to 100° centigrade and is then heated to 160° centigrade, being kept at this temperature for some hours. The melt is then allowed to cool, poured into dilute acid and worked up in the usual manner. The reaction product, a chlorbromisodibenzanthrone, which is a violet powder, dissolves in concentrated sulphuric acid with a green colouration, it yields a green-blue vat and gives violet dyeings having excellent fastness on cotton.

In an analogous manner a reaction product containing chlorine and bromine which gives dyeings not changing when spotted with water and of very good fastness which are independent of the temperature of the dyebath, is obtained from dibenzanthrone by brominating in a mixture of aluminium chloride and common salt, subsequently heating the bromination melt to 140° centigrade and adding iron chloride.

Similar reaction products are obtained by the treatment of bromdibenzanthrones or bromisodibenzanthrones with iron chloride, common salt or iron chloride, common salt and aluminium chloride in the absence of diluents.

*Example 4*

23 parts of pure dibenzanthrone are suspended while stirring at between 130° and 140° C. in a mixture of 200 parts of aluminium chloride and 40 parts of sodium chloride, whereupon 60 parts of bromine are slowly run into the reaction mixture which is kept at the said temperature for several hours. The melt is then taken up with hot water, the precipitate filtered off and washed until neutral. The reaction product, a pentabromochlorodibenzanthrone dissolves in oleum to give a violet solution and dyes the vegetable fibre from a blue vat navy blue shades of very good fastness.

When employing only 20 parts of bromine a dibromoderivative is obtained which also dyes navy blue shades.

*Example 5*

23 parts of pure isodibenzanthrone are introduced while stirring at about 130° C. into a melt of 200 parts of aluminium chloride and 40 parts of sodium chloride, whereupon a stream of dry chlorine is passed into the melt for a short time, and then 20 parts of bromine are added to the reaction mixture which is stirred for some hours at between 130 and 140° C. The reaction mixture is then worked up as usual. The chlorobromoisodibenzanthrone thus obtained dissolves in concentrated sulphuric acid to give a green solution and dyes the vegetable fibre blue violet shades of very good fastness from a blue vat.

*Example 6*

23 parts of dibenzanthrone are introduced while stirring at 130° C. into a melt of 200 parts of aluminium chloride in 40 parts of sodium chloride whereupon a current of dry chlorine is passed into the melt for several hours and the reaction mixture worked up as usual. The chlorodibenzanthrone thus obtained dissolves in concentrated sulphuric acid to give a violet solution and dyes cotton very fast blue violet shades from a blue vat.

*Example 7*

86 parts of pentabromodibenzanthrone are introduced at about 80° C. into a melt of 500 parts of anhydrous iron chloride and 75 parts of sodium chloride, the melt being then slowly heated to between 130° and 140° C. and kept thereat for a short time, whereupon the reaction mixture is taken up with water after cooling and worked up as usual. The pentabromomonochlorodibenzanthrone thus obtained is a dark blue paste and a dark blue powder when dried, dissolves in oleum to give a violet solution and dyes cotton excellently fast navy blue shades.

What we claim is:—

1. A process of producing halogenated derivatives of the dibenzanthrone series, which comprises treating a dibenzanthrone in a fused anhydrous metal halide with a halogenating agent in the absence of a diluent.

2. A process of producing halogenated derivatives of the dibenzanthrone series, which comprises treating a dibenzanthrone in a fused anhydrous metal halide to which a substance lowering the melting point of the said halide has been added, with a halogenating agent in the absence of a diluent.

3. A process of producing halogenated derivatives of the dibenzanthrone series, which comprises treating a dibenzanthrone with an anhydrous metal halide supplying halogen above the dissociating temperature of the said halide and a halogenating agent in the absence of a diluent.

4. A process of producing halogenated derivatives of the dibenzanthrone series, which comprises treating a dibenzanthrone with a fused anhydrous metal halide supplying halogen to which a substance lowering the melting point of the said halide has been added above the dissociating temperature of the said halide and a halogenating agent in the absence of a diluent.

5. A process of producing halogenated derivatives of the dibenzanthrone series, which comprises treating a halogenated dibenzanthrone with a fused anhydrous metal halide supplying a halogen different from that already present in the initial material above the dissociating temperature of the said halide in the absence of a diluent.

6. As new articles of manufacture pentabromodibenzanthrones containing chlorine.

MAX ALBERT KUNZ.
KARL KOEBERLE.
ERICH BERTHOLD.